US007991040B2

(12) United States Patent
van Veen et al.

(10) Patent No.: US 7,991,040 B2
(45) Date of Patent: Aug. 2, 2011

(54) METHODS AND APPARATUS FOR REDUCTION OF A PEAK TO AVERAGE RATIO FOR AN OFDM TRANSMIT SIGNAL

(75) Inventors: Durk L. van Veen, Santee, CA (US);
Fuyun Ling, San Diego, CA (US);
Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 845 days.

(21) Appl. No.: 11/519,256

(22) Filed: Sep. 11, 2006

(65) Prior Publication Data
US 2007/0230596 A1  Oct. 4, 2007

Related U.S. Application Data

(60) Provisional application No. 60/789,558, filed on Apr. 4, 2006.

(51) Int. Cl.
*H04B 1/00* (2006.01)

(52) U.S. Cl. ........ 375/140; 375/142; 375/143; 375/145; 375/146; 375/246; 375/365; 375/366; 375/367; 370/335; 370/280; 370/342; 370/514; 370/515; 380/268

(58) Field of Classification Search .......... 375/140, 375/142, 143, 145, 146, 246, 365, 366, 367; 370/335, 280, 342, 514, 515; 380/268
See application file for complete search history.

(56) References Cited

U.S. PATENT DOCUMENTS

| 4,341,925 | A | * | 7/1982 | Doland et al. | 380/262 |
|---|---|---|---|---|---|
| 5,596,330 | A | * | 1/1997 | Yokev et al. | 342/387 |
| 5,751,761 | A | * | 5/1998 | Gilhousen | 375/146 |
| 5,955,917 | A | * | 9/1999 | Mandell et al. | 330/2 |
| 6,490,267 | B1 | * | 12/2002 | Kim et al. | 370/342 |
| 6,853,686 | B1 | | 2/2005 | Cupo et al. | |
| 7,443,906 | B1 | * | 10/2008 | Bang et al. | 375/140 |
| 7,515,615 | B2 | | 4/2009 | Peeters et al. | |

(Continued)

FOREIGN PATENT DOCUMENTS

WO  0013337  3/2000

(Continued)

OTHER PUBLICATIONS

International Search Report-PCT/US07/066004, International Search Authority-European Patent Office-Aug. 29, 2007.

(Continued)

*Primary Examiner* — Mohammad H Ghayour
*Assistant Examiner* — Sung Ahn
(74) *Attorney, Agent, or Firm* — Ryan Farr

(57) ABSTRACT

Methods and apparatus for reduction of a peak to average ratio for an OFDM transmit signal. In an aspect, a method is provided for reducing a peak to average ratio of a transmit waveform. The method includes obtaining a primary scrambler sequence, generating a secondary scrambler sequence having a length characteristic based on data to be scrambled, and combining the primary and secondary scrambler sequences to produce a PAR reduction sequence. In another aspect, an apparatus is provided for reducing a peak to average ratio of a transmit waveform. The apparatus includes a secondary generator configured to generate a secondary scrambler sequence having a length characteristic based on data to be scrambled, and combining logic configured to combine a primary scrambler sequence and the secondary scrambler sequences to produce a PAR reduction sequence.

35 Claims, 6 Drawing Sheets

U.S. PATENT DOCUMENTS

2002/0126650 A1* 9/2002 Hall et al. .................. 370/349
2003/0142656 A1* 7/2003 Padovani et al. ............ 370/347
2006/0140156 A1* 6/2006 Hayashi et al. ............. 370/335

FOREIGN PATENT DOCUMENTS

WO    WO2007115331    10/2007

OTHER PUBLICATIONS

Written Opinion-PCT/US07/066004, International Search Authority-European Patent Office-Aug. 29, 2007.

Taiwanese Search report—096112210—TIPO—Jul. 30, 2010.

\* cited by examiner

METHODS AND APPARATUS FOR
REDUCTION OF A PEAK TO AVERAGE
RATIO FOR AN OFDM TRANSMIT SIGNAL

CLAIM OF PRIORITY UNDER 35 U.S.C. §119

The present Application for Patent claims priority to Provisional Application No. 60/789,558 entitled "PEAK-TO-AVERAGE RATIO REDUCTION IN UNALLOCATED SEGMENTS" filed Apr. 4, 2006, and assigned to the assignee hereof and hereby expressly incorporated by reference herein.

BACKGROUND

1. Field

The present application relates generally to the transmission of information over a distribution network, and more particularly, to methods and apparatus for reduction of a peak to average ratio for an OFDM transmit signal.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and power efficiency.

In current content delivery/media distribution systems, real time and non real time services are packed and delivered to devices on a network. For example, a communication network may utilize Orthogonal Frequency Division Multiplexing (OFDM) to provide communications between a network server and one or more mobile devices. In this technology, a stream of OFDM symbols forming a transmit waveform are packed with services to be delivered over the distribution network. Each symbol comprises a number of sub-carriers that are modulated by the data to be transmitted.

Typically, transmit waveforms need to meet specifications set by regulatory authorities. In order to meet selected spectrum specifications, the amplification of transmitted signals should not introduce any distortion. For example, a transmitter's power amplifier should operate linearly over the entire dynamic range of the transmit signal.

One measurement of a transmit waveform is referred to as the Peak-to-Average-Ratio (PAR). Generally, transmit waveforms having higher PAR levels require bigger power amplifiers which consume more power. One approach used to reduce the PAR levels of a transmit waveform is to clip the transmit waveform to ensure certain PAR characteristics. Unfortunately, this technique has the consequence of producing high out-of-band frequency components, which are undesirable.

Therefore, it would be advantageous to have a system that operates to reduce the PAR levels of a transmit waveform without producing high out-of-band frequency components and thereby overcoming the problems associated with high PAR levels.

SUMMARY

In one or more aspects, a PAR reduction system, comprising methods and apparatus, is provided that operates to reduce the PAR levels of a transmit waveform. For example, a transmit waveform can have a higher PAR level when no actual data is being transmitted as compared to the PAR level during actual data transmission. In an aspect, the PAR reduction system operates to ensure that the transmit waveform has substantially the same PAR levels whether or not actual data is being transmitted. Because the system operates to reduce the PAR levels of a transmit waveform, it is possible to reduce power amplifier size and corresponding power consumption.

In an aspect, a method is provided for reducing a peak to average ratio of a transmit waveform. The method comprises obtaining a primary scrambler sequence, generating a secondary scrambler sequence having a length characteristic based on data to be scrambled, and combining the primary and secondary scrambler sequences to produce a PAR reduction sequence.

In another aspect, an apparatus is provided for reducing a peak to average ratio of a transmit waveform. The apparatus comprises a secondary generator configured to generate a secondary scrambler sequence having a length characteristic based on data to be scrambled, and combining logic configured to combine a primary scrambler sequence and the secondary scrambler sequences to produce a PAR reduction sequence.

In another aspect, an apparatus is provided for reducing a peak to average ratio of a transmit waveform. The apparatus comprises means for obtaining a primary scrambler sequence, means for generating a secondary scrambler sequence having a length characteristic based on data to be scrambled, and means for combining the primary and secondary scrambler sequences to produce a PAR reduction sequence.

In another aspect, a computer-readable medium is provided that has a computer program comprising instructions, which when executed by at least one processor, operate to reduce a peak to average ratio of a transmit waveform. The computer program comprises instructions for obtaining a primary scrambler sequence, instructions for generating a secondary scrambler sequence having a length characteristic based on data to be scrambled, and instructions for combining the primary and secondary scrambler sequences to produce a PAR reduction sequence.

In still another aspect, at least one processor is provided that is configured to perform a method for reducing a peak to average ratio of a transmit waveform. The method comprises obtaining a primary scrambler sequence, generating a secondary scrambler sequence having a length characteristic based on data to be scrambled, and combining the primary and secondary scrambler sequences to produce a PAR reduction sequence.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following description when taken in conjunction with the accompanying drawings wherein.

DESCRIPTION

In one or more aspects, a PAR reduction system is provided that operates to reduce the PAR levels of a transmit waveform in an OFDM system. For example, in an aspect, the transmit waveform comprises a transmission frame having multiplexed content flows with a particular arrangement, sequence, interleaving, and/or other encoding of real-time and/or other than real-time services. Such a transmission frame has some number of non data (or zero) values that operate to increase the PAR levels of the transmit waveform. The PAR reduction system operates to reduce high PAR levels caused by the non data values to ensure that the transmit waveform has substantially the same PAR levels whether or not actual data is being transmitted. Thus, by reducing the PAR levels of the transmit waveform it is possible to reduce power amplifier size and corresponding power consumption.

Figure 1:
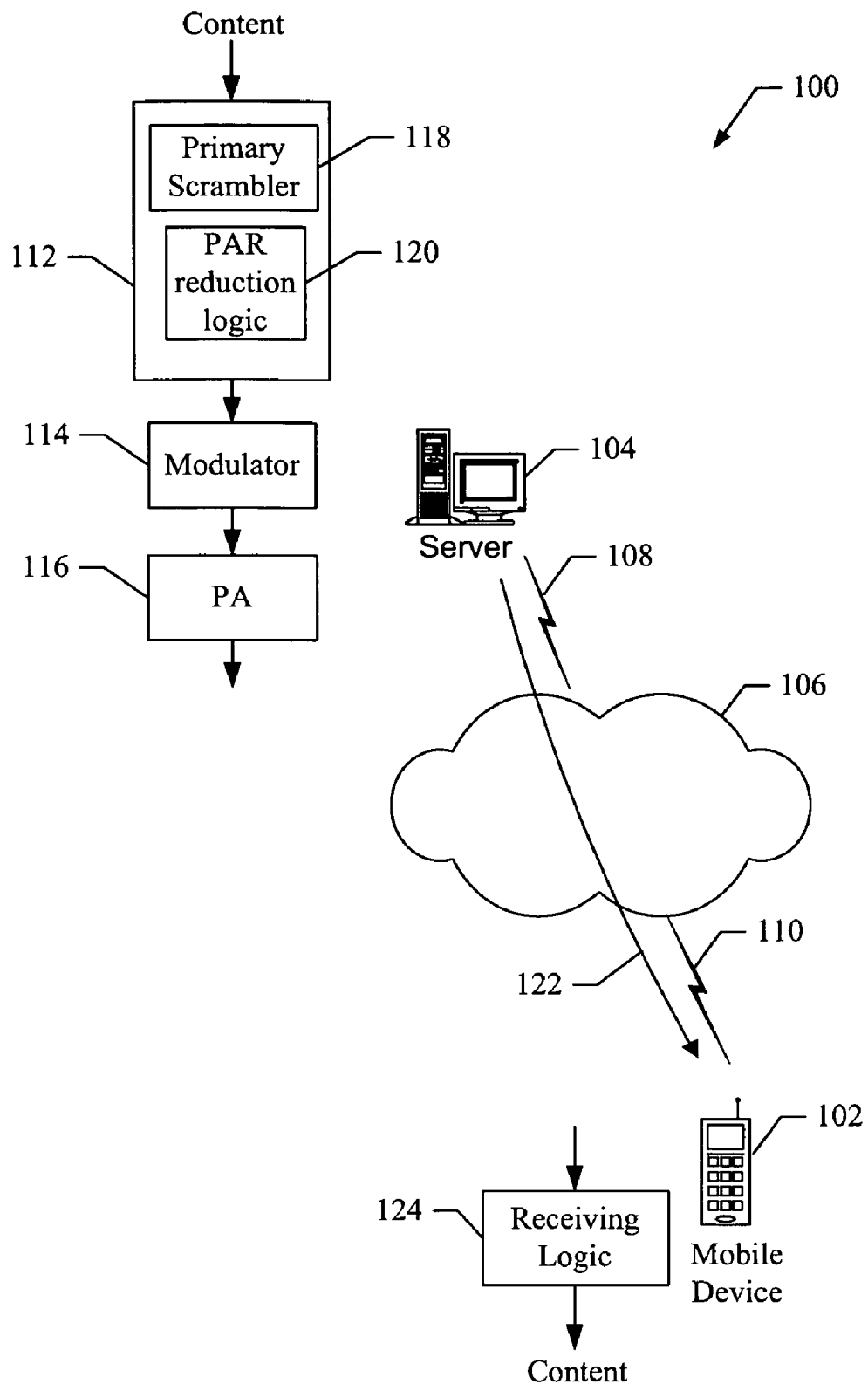
FIG. 1 shows a network that comprises an aspect of a PAR reduction system.

FIG. 1 shows a network 100 that comprises an aspect of a PAR reduction system. The network 100 comprises a mobile device 102, a server 104, and a data network 106. For the purpose of this description, it will be assumed that the data network 106 operates to provide communications between the server 104 and one or more mobile devices using OFDM technology.

In an aspect, the server 104 operates to provide services that may be subscribed to by devices in communication with the network 106. The server 104 is coupled to the network 106 through the communication link 108. The communication link 108 comprises any suitable communication link, such as a wireless link based on OFDM technology that operates to allow the server 104 to communicate with the network 106. The network 106 comprises any combination of wired and/or wireless networks that allows services to be delivered from the server 104 to devices in communication with the network 106, such as the device 102.

The device 102 in this aspect comprises a mobile telephone that communicates with the network 106 through the wireless link 110. In an aspect, the wireless link 110 comprises a wireless communication link based on OFDM technology.

It should be noted that the network 106 may communicate with any number and/or types of portable devices. For example, other devices suitable for use in aspects of the PAR reduction system include, but are not limited to, a personal digital assistant (PDA), email device, pager, a notebook computer, mp3 player, video player, or a desktop computer.

The server 104 comprises content that includes real time and/or non real time services. For example, the services comprise multimedia content that includes news, sports, weather, financial information, movies, and/or applications, programs, scripts, or any other type of suitable content or service. Thus, the services may comprise video, audio or other information formatted in any suitable format.

The content is input to baseband processing logic 112. The baseband processing logic 112 processes the content to produce a baseband waveform comprising one or more transmission frames that contain the content. For example, the baseband processing logic 112 may comprise encoders, interleavers, scramblers, mappers, D/A converters and/or any other type of baseband processing logic. In an aspect, the baseband processing logic comprises a primary scrambler 118 that generates a primary scrambler sequence of bits that are used to scramble the baseband waveform. The primary scrambler bits operate to randomize the baseband waveform over a long time interval. For example, the primary scrambler bits may randomize the baseband waveform over several OFDM symbols. However, using only the primary scrambler sequence to randomize the data may not result in data that is sufficiently randomized, thereby resulting in time-domain OFDM symbols with higher PAR levels as compared to that which could be achieved with truly randomized data.

To obtain reduced PAR levels, the baseband processing logic 112 also comprises PAR reduction logic 120. The PAR reduction logic 120 operates to provide a secondary scrambler sequence of bits. The secondary scrambler sequence has a length that is chosen based on the amount of data in each OFDM symbol. In one or more aspects, the secondary scrambler bits are selectively combined with the primary scrambler bits to produce a PAR reduction sequence that is used to more thoroughly randomize the baseband data. In an aspect, the secondary scrambler sequence is continuously combined with the primary scrambler sequence to produce the PAR reduction sequence that is used to randomize the baseband data. In another aspect, the secondary scrambler sequence is selectively combined with the primary scrambler sequence to produce the PAR reduction sequence. For example, the secondary sequence is selectively combined when the data to be scrambled has non data (or zero) values. This aspect has the added advantage of being backward compatible with receiving devices that currently descramble received data based only on the primary scrambling sequence. The generated PAR reduction sequence is then used to thoroughly randomize the baseband data to produce a reduced PAR baseband waveform.

The reduced PAR baseband waveform produced by the baseband processing logic 112 is input to a modulator 114 that operates to modulate the baseband waveform into a transmit waveform. This transmit waveform is input to a power amplifier (PA) 116 where it is amplified for transmission over the network 106, as shown by 122. Because the PAR reduction logic 120 more thoroughly randomizes the baseband data, the transmit waveform has reduced PAR levels, which allows the PA 116 to be small to conserve cost and power.

The device 102 receives the transmit waveform at receiving logic 124. The receiving logic 124 operates to provide any necessary processes to decode the transmit waveform to obtain the transmitted services. In the case where the PAR Reduction logic 120 is active all the time, the receiving logic 124 operates to undo the second level of scrambling. In an aspect where the PAR Reduction logic 120 is only active on sub-carriers that are known to be empty, (i.e. the receiver will never try to demodulate them), there is no impact on the receiving logic 124. Thus, the system becomes backward compatible.

Therefore, aspects of a PAR reduction system operate to provide PAR reduction by performing one or more of the following operations.

a. Generate a secondary scrambler sequence of bits.
b. Selectively combine the secondary scrambler sequence with a primary scrambler sequence to produce a PAR reduction sequence.
c. Scramble baseband data with the PAR reduction sequence to produce a thoroughly randomized baseband waveform that will result in a transmit waveform having reduced PAR levels.

Therefore, aspects of a PAR reduction system operate to efficiently reduce the PAR levels of a transmit waveform. It should be noted that the PAR reduction system is not limited to the implementations described with reference to FIG. 1, and that other implementations are possible within the scope of the aspects.

PAR Definition

The PAR reduction system operates to reduce the PAR levels of a transmit waveform. For the purpose of this description, PAR is defined according to the following expression.

$$PAR = \max(|x_{Norm}(t)|^2)$$

where, $x_{Norm}(t) = x(t)/\sigma_x$ $x(t)$ is the baseband waveform (complex envelope)

$\sigma_x^2$ is the baseband signal power

Note that a sine-wave at the carrier frequency has a PAR of 0 dB at baseband and 3 dB at passband. In general, PAR of the passband waveform is 3 dB higher than the baseband waveform.

Figure 2:
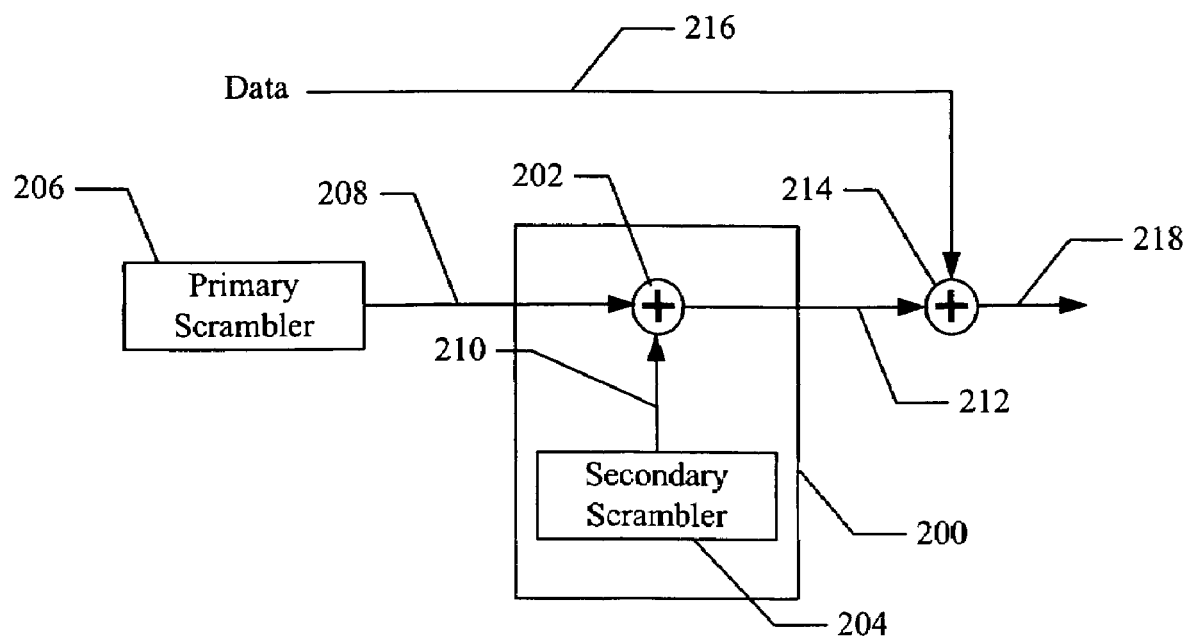
FIG. 2 shows an aspect of PAR reduction logic for use in a PAR reduction system.

FIG. 2 shows an aspect of PAR reduction logic 200 for use in a PAR reduction system. For example, the PAR reduction logic 200 is suitable for use as the PAR reduction logic 120 shown in FIG. 1. The PAR reduction logic 200 comprises exclusive "OR" logic 202 and a secondary scrambler 204.

A primary scrambler 206 operates to generate a sequence of primary scrambler bits 208 that are received by the PAR reduction logic 200. For example, the primary scrambler 206 may be provided by typical baseband processing logic, for instance, the primary scrambler 118 shown in FIG. 1. In an aspect, the sequence of primary scrambler bits 208 is a long sequence so that data from several OFDM symbols can be randomized. The primary scrambler bits 208 are input to the exclusive "OR" logic 202.

The secondary scrambler 204 operates to provide a sequence of secondary scrambler bits 210, which are also input to the exclusive "OR" logic 202. In an aspect, the sequence of secondary scrambler bits 210 is shorter that the primary sequence 208 and is designed to randomize data within one OFDM symbol. In an aspect, the secondary scrambler 204 comprises a lookup table from which the secondary scrambler sequence 210 is generated. For example, selected values are read out of the lookup table in a particular order to produce the secondary sequence 210.

In another aspect, the secondary scrambler 204 comprises a linear feedback shift register (LFSR) that is initialized with a selected seed value. The LFSR has a length characteristic that is selected based on the length of the data to be transmitted in one OFDM symbol. The exclusive "OR" logic 202 operates to combine the primary and secondary scrambler sequences to produce a PAR reduction sequence 212.

The PAR reduction sequence 212 is input to exclusive "OR" logic 214, which also receives baseband data 216. The operation of the exclusive "OR" logic 214 produces reduced PAR scrambled data 218. The reduced PAR scrambled data 218 can then be processed into an OFDM transmit waveform that will exhibit reduced PAR levels.

In an aspect, the PAR reduction logic 200 comprises a CPU, processor, gate array, digital/analog hardware logic, virtual machine, software, and/or any combination of hardware and software. For example, the exclusive "OR" 202 may be implemented using discrete hardware and the secondary scrambler 204 may be implemented by a CPU executing one or more instructions.

In an aspect, the PAR reduction system comprises a computer program having one or more program instructions ("instructions") stored on a computer-readable medium, which when executed by at least one processor, for instance at the PAR reduction logic 200, provides the functions of the PAR reduction system described herein. For example, instructions may be loaded into the PAR reduction logic 200 from a computer-readable media, such as a floppy disk, CDROM, memory card, FLASH memory device, RAM, ROM, or any other type of memory device or computer-readable medium that interfaces to the PAR reduction logic 200. In another aspect, the instructions may be downloaded into the PAR reduction logic 200 from an external device or network resource. The instructions, when executed by the PAR reduction logic 200 operate to provide aspects of a PAR reduction system as described herein.

Figure 3:
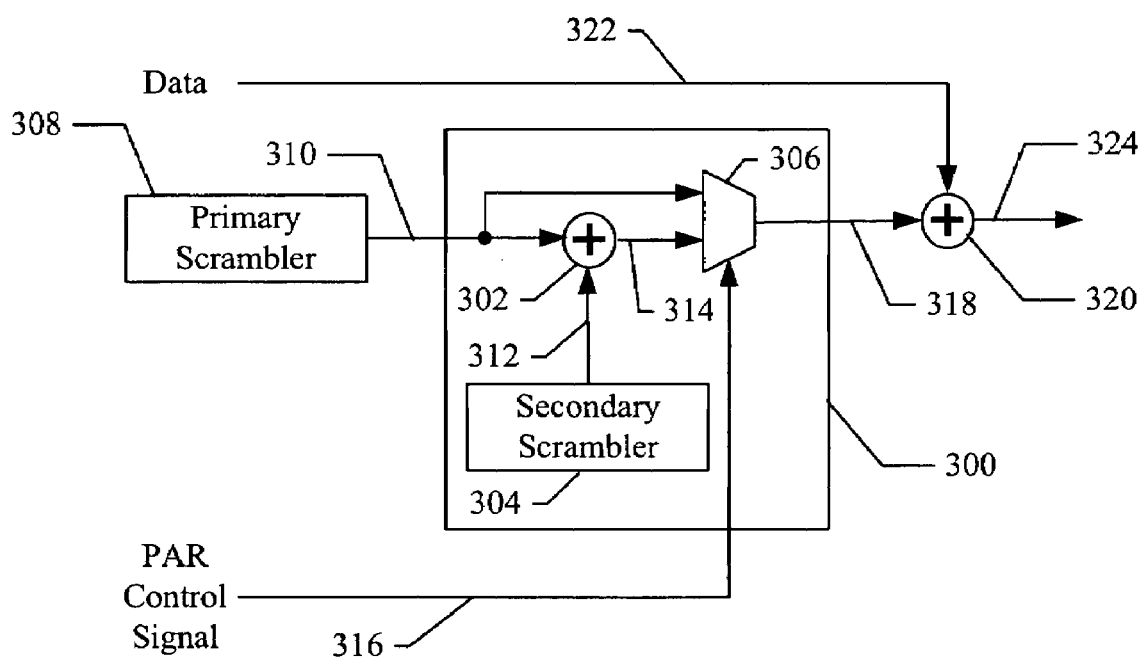
FIG. 3 shows an aspect of PAR reduction logic for use in a PAR reduction system.

FIG. 3 shows an aspect of PAR reduction logic 300 for use in a PAR reduction system. For example, the PAR reduction logic 300 is suitable for use as the PAR reduction logic 120 shown in FIG. 1. The PAR reduction logic 300 comprises exclusive "OR" logic 202, a secondary scrambler 204, and selector logic 306.

A primary scrambler 308 operates to generate a sequence of primary scrambler bits 310 that are received by the PAR reduction logic 300. For example, the primary scrambler 308 may be provided by typical baseband processing logic, for instance, the primary scrambler 118 shown in FIG. 1. In an aspect, the sequence of primary scrambler bits 310 is a long sequence so that data from several OFDM symbols can be randomized. The primary scrambler bits 310 are input to exclusive "OR" logic 302 and selector 306.

The secondary scrambler 304 operates to provide a secondary scrambler sequence of bits 312, which are also input to the exclusive "OR" logic 302. In an aspect, the sequence of secondary scrambler bits 312 is shorter that the primary sequence 310 and is designed to randomize data within one OFDM symbol. The exclusive "OR" logic 302 operates to combine the primary (310) and secondary (312) scrambler bits to produce a combined scrambler sequence 314. The combined scrambler sequence 314 is input to the selector 306.

The selector logic 306 comprises any suitable hardware and/or software that operate to select one of its two inputs to appear at a selector output based on a PAR control signal 316. The PAR control signal 316 is typically generated by transmitter logic (not shown) and identifies non data values in the baseband waveform. For example, the PAR control signal 316 is at a first state (i.e., zero) when the baseband data comprises actual data values, and a second state (i.e., one) when the baseband data comprises non data (or zero) values. When the PAR control signal 316 is in its first state, the selector logic 306 operates to provide the primary scrambler sequence 310 at its output as a PAR reduction sequence 318. When the PAR control signal 316 is in its second state, the selector logic 306 operates to provide the combined scrambler sequence 314 at its output as a PAR reduction sequence 318. Thus, the selector logic 306 operates to selectively combine the secondary scrambler sequence 312 with the primary scrambler sequence 310 based on the PAR control signal 316 to produce the PAR reduction sequence 318.

The PAR reduction sequence 318 is input to exclusive "OR" logic 320, which also receives baseband data 322. The operation of the exclusive "OR" logic 320 produces reduced PAR scrambled data 324. The reduced PAR scrambled data 324 can then be processed into an OFDM transmit waveform that will exhibit reduced PAR levels.

In an aspect, the PAR reduction logic 300 comprises a CPU, processor, gate array, digital/analog hardware logic, virtual machine, software, and/or any combination of hardware and software. For example, the exclusive "OR" 302 and the selector logic 306 may be implemented using discrete hardware and the secondary scrambler 304 may be implemented by a CPU executing one or more instructions.

In an aspect, the PAR reduction system comprises a computer program having one or more program instructions ("instructions") stored on a computer-readable medium, which when executed by at least one processor, for instance at the PAR reduction logic 300, provides the functions of the PAR reduction system described herein. For example, instructions may be loaded into the PAR reduction logic 300 from a computer-readable media, such as a floppy disk, CDROM, memory card, FLASH memory device, RAM, ROM, or any other type of memory device or computer-readable medium that interfaces to the PAR reduction logic 300. In another aspect, the instructions may be downloaded into the PAR reduction logic 300 from an external device or network resource. The instructions, when executed by the PAR reduction logic 300 operate to provide aspects of a PAR reduction system as described herein.

Figure 4:
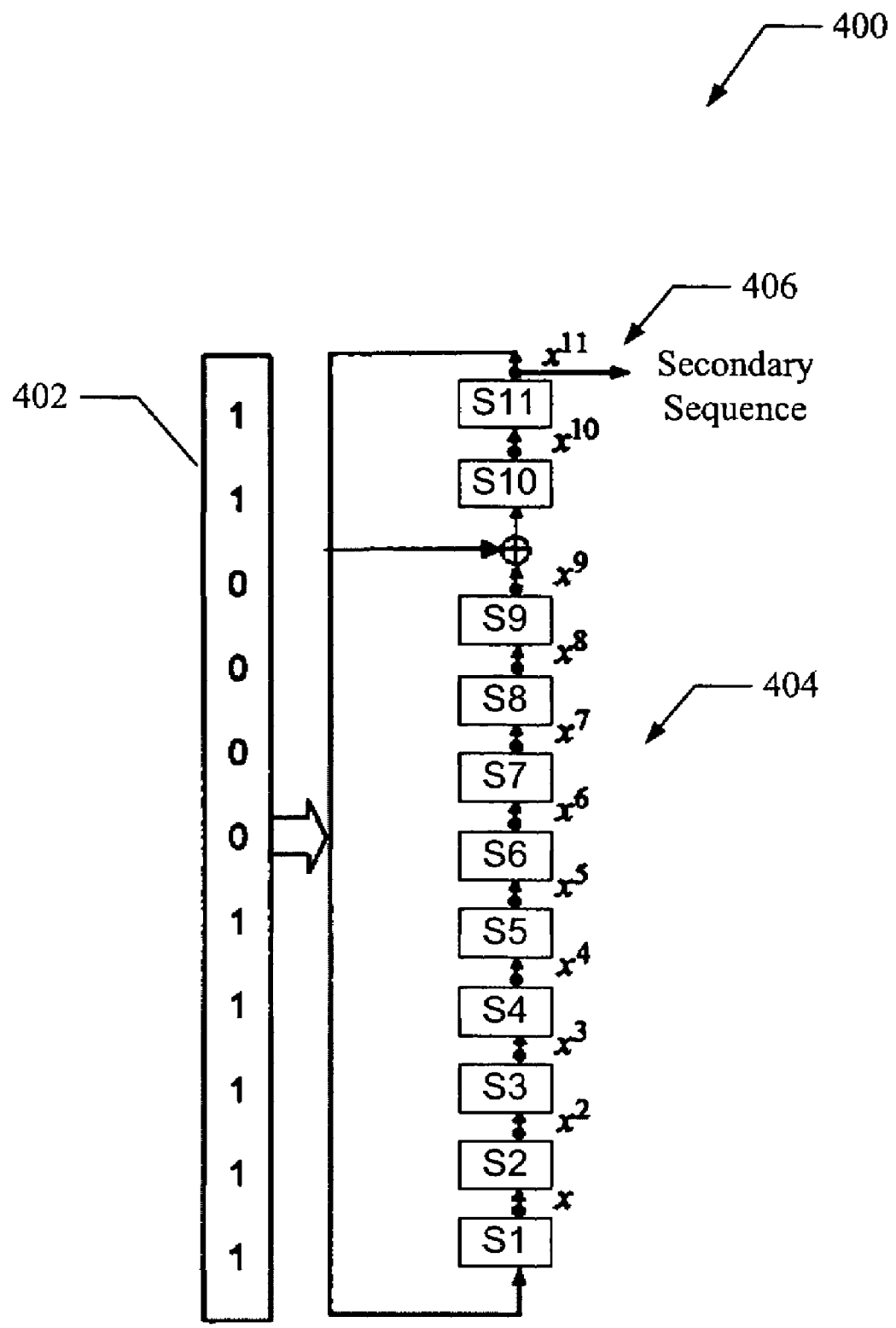
FIG. 4 shows an aspect of a linear feedback shift register for use in a PAR reduction system.

FIG. 4 shows an aspect of a LFSR 400 for use in a PAR reduction system. For example, the LFSR 400 is suitable for use as the secondary scrambler 204 shown in FIG. 2, or the secondary scrambler 304 shown in FIG. 3. It will be assumed that the secondary scrambler sequence to be generated has a length of 1000 bits based on the amount of data to be transmitted in one OFDM symbol. Thus, the first 1000 bits output from the LFSR 400 will be used as the secondary scrambler sequence.

The LFSR 400 comprises a seed register 402 and a group of shift registers (S1-S11) shown generally at 404. The seed register 402 contains a seed value that is loaded into the shift registers 404. During operation, the shift registers 404 operate to shift their respective output values to a subsequent stage and thereby output a secondary sequence 406 of data bits that are used to provide PAR reduction.

Thus, the LFSR 400 operates in aspects of a PAR reduction system to provide reduced PAR levels for a transmit waveform. It should be noted that LFSR 400 is just one implementation and that other implementations are possible within the scope of the aspects.

Secondary Sequence Length Determination

As described above, the secondary sequence may be generated using a lookup table or a LFSR. A table provides flexibility since virtually any sequence can be easily generated. However, a table is more expensive because it requires memory. The LFSR is less flexible, but is also easy to implement and generally less costly. It should be noted, however, that any other suitable technique may be used to generate the secondary sequence for use in aspects of a PAR reduction system.

In one or more aspects, the length of the secondary sequence is determined from the data to be transmitted. For example, in an aspect, the length of the secondary sequence is substantially equal to the amount of data to be transmitted in one OFDM symbol. For example, assume that an OFDM symbol comprises 500 sub-carriers, and that each sub-carrier is modulated using QPSK, which encodes two bits per sub-carrier. Then the number of data bits per OFDM symbol is 1000. Therefore, a LFSR of 10 bits would be needed to produce a secondary sequence of 1000 bits with which to scramble the data.

In general, the length of the secondary scrambler sequence can be determined from the number of sub-carriers (N) in a symbol multiplied by the number of bits per sub-carrier. However, it should be noted that although this length is preferable, it is not necessary to achieve improvements in PAR reduction. For example, secondary sequences somewhat longer than the amount of data to be transmitted in one OFDM symbol may be used. For example, PAR reduction can be achieved when at least a substantial portion of a generated secondary sequence is used to randomize the data contained one OFDM symbol. Thus, PAR reduction can be realized with a range of secondary sequence lengths, noting however, that optimum performance is achieved when the second scrambler sequence is substantially the same length as the incoming data packet.

Figure 5:
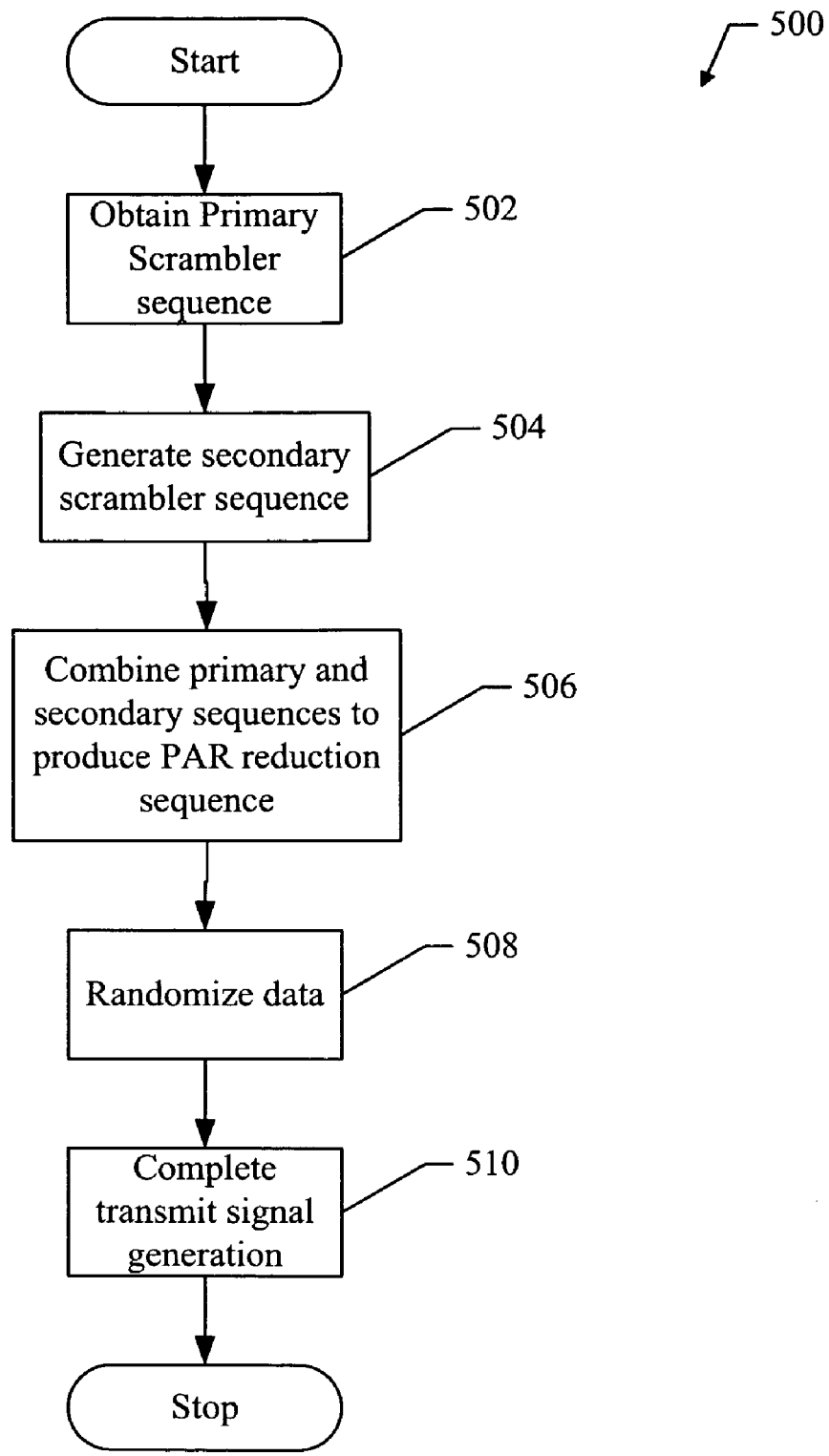
FIG. 5 shows an aspect of a method for providing a PAR reduction system.

FIG. 5 shows an aspect of a method 500 for providing a PAR reduction system. For example, in one or more aspects, the PAR reduction logic 200 and/or the PAR reduction logic 300 are configured to perform the method 500 as describe below.

At block 502, a primary scrambler sequence is obtained. For example, the primary scrambler sequence is a sequence of data bits that can be combined with data to be transmitted to provide randomization over a long time interval (i.e., several OFDM symbols). In an aspect, the primary scrambler sequence is received by the exclusive "OR" logic 202 from primary scrambler 206.

At block 504, a secondary scrambler sequence is generated. For example, the secondary sequence is a sequence of data bits that can be combined with data to be transmitted to provide randomization over a selected time interval (i.e., one OFDM symbol). In an aspect, the secondary scrambler sequence is shorter in length than the primary scrambler sequence and its length is based on the data to be scrambled. In an aspect, the secondary scrambler 204 operates to generate the secondary scrambler sequence 210.

At block 506, the primary scrambler sequence is combined with the secondary scrambler sequence. In an aspect, the secondary scrambler sequence is continuously combined with the primary scrambler sequence. For example, the exclusive "OR" logic 202 operates to combine the primary 208 and secondary 210 scrambler sequences to produce a PAR reduction sequence 212.

In another aspect, the secondary scrambler sequence is selectively combined with the primary scrambler sequence. For example, the selection logic 306 operates to output either the primary scrambler sequence 310 or a combined scrambler sequence 314 based on the PAR control signal 316. The output from the selection logic 306 forms a PAR reduction sequence.

At block 508, the PAR reduction sequence is combined with the transmit data. In an aspect, the PAR reduction sequence 212 is combined with data by the exclusive "OR" logic 214 to produce the PAR reduced data 218. In another aspect, the PAR reduction sequence 318 is combined with data by the exclusive "OR" logic 320 to produce the PAR reduced data 324.

At block 510, a PAR reduced transmit waveform is generated. For example, the PAR reduced data 218 is processed by transmitting logic that operates to modulate and amplify the PAR reduced data 218 into a transmit waveform for transmission over an OFDM network.

It should be noted that the method 500 represents just one implementation and the changes, additions, deletions, combinations or other modifications of the method 500 are possible within the scope of the aspects.

Figure 6:
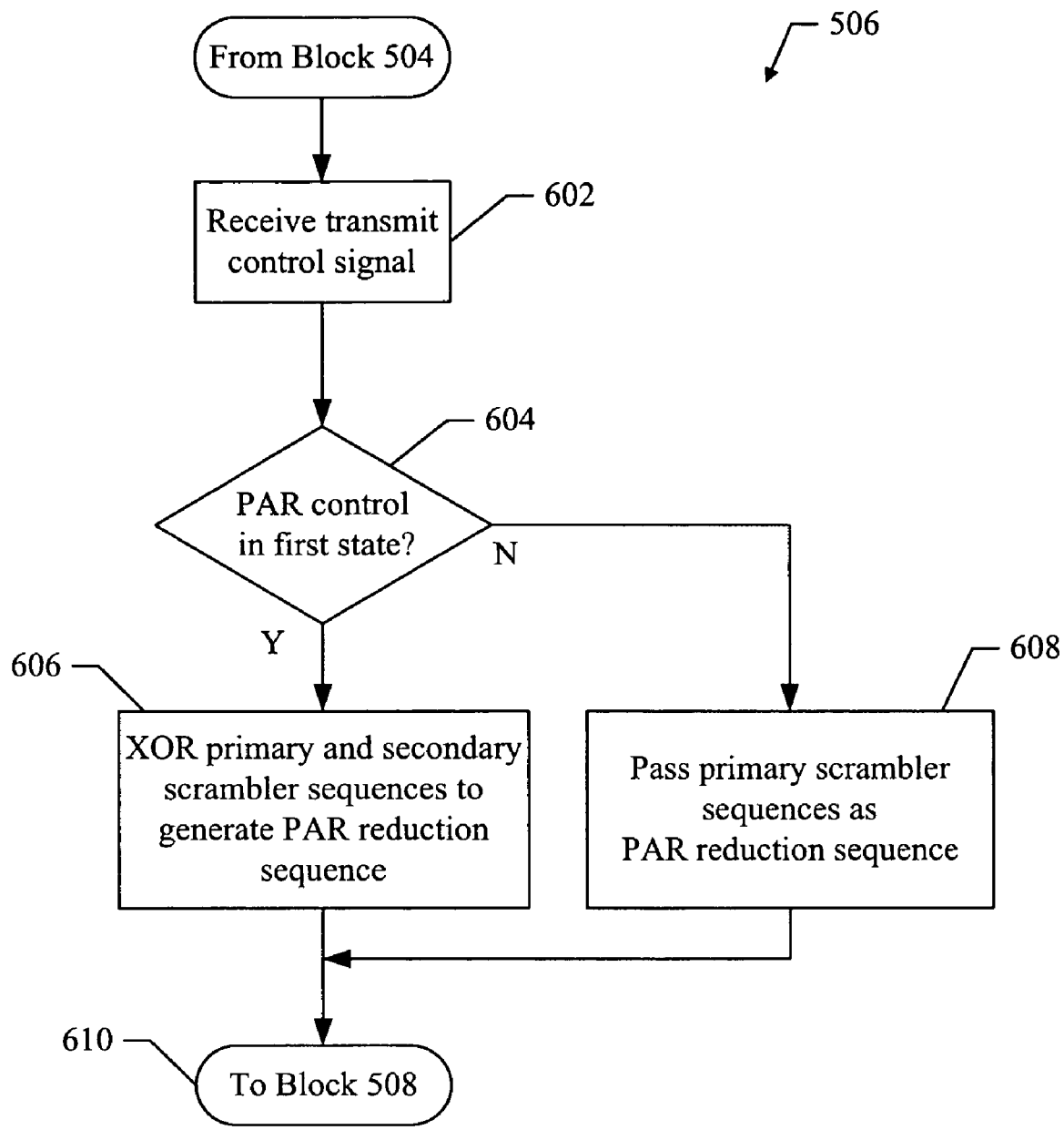
FIG. 6 shows an aspect of a method for selectively combining primary and secondary scrambler sequences to form a PAR reduction sequence for use in a PAR reduction system.

FIG. 6 shows an aspect of a method 600 for selectively combining primary and secondary scrambler sequences to form a PAR reduction sequence for use in a PAR reduction system. For example, the method 600 is suitable for use to perform the operations described at block 506 of the method 500 shown in FIG. 5. In an aspect, the PAR reduction logic 300 is configured to perform the method 600 as describe below.

At block 602, a PAR control signal is received. For example, the PAR control signal is provided by transmitter logic and identifies non data values in the baseband waveform. In an aspect, the PAR control signal 316 is received by the selector 306.

At block 604, a test is performed to determine if a PAR control signal is in a second state. For example, the second state indicates that baseband data to be transmitted comprises non data (or zero) values. If the PAR control signal 316 is in the second state, the method proceeds to block 606. If the PAR control signal 316 is not in the second state, the method proceeds to block 608.

At block 606, a primary scrambler sequence and a secondary scrambler sequence are combined to form a PAR reduction sequence. For example, the primary sequence 310 is combined with the secondary sequence 312 by the exclusive "OR" logic 302 to produce a combined scrambler sequence 314, which is input to the selector 306. Because the PAR control signal 316 has been determined to be in the second state, the selector 306 operates to output the combined scrambler sequence 314 at the selector output as the PAR reduction sequence 318.

At block 608, a primary scrambler sequence is passed as a PAR reduction sequence. For example, the primary sequence 310 is input to the selector 306. Because the PAR control signal 316 has been determined not to be in the second state, the selector 306 operates to output the primary sequence 310 at the selector output as the PAR reduction sequence 318.

At block 610, the method proceeds to block 508 of the method 500 where the generated PAR reduction sequence is used to scramble data to be transmitted.

It should be noted that the method 600 represents just one implementation and the changes, additions, deletions, combinations or other modifications of the method 600 are possible within the scope of the aspects.

Figure 7:
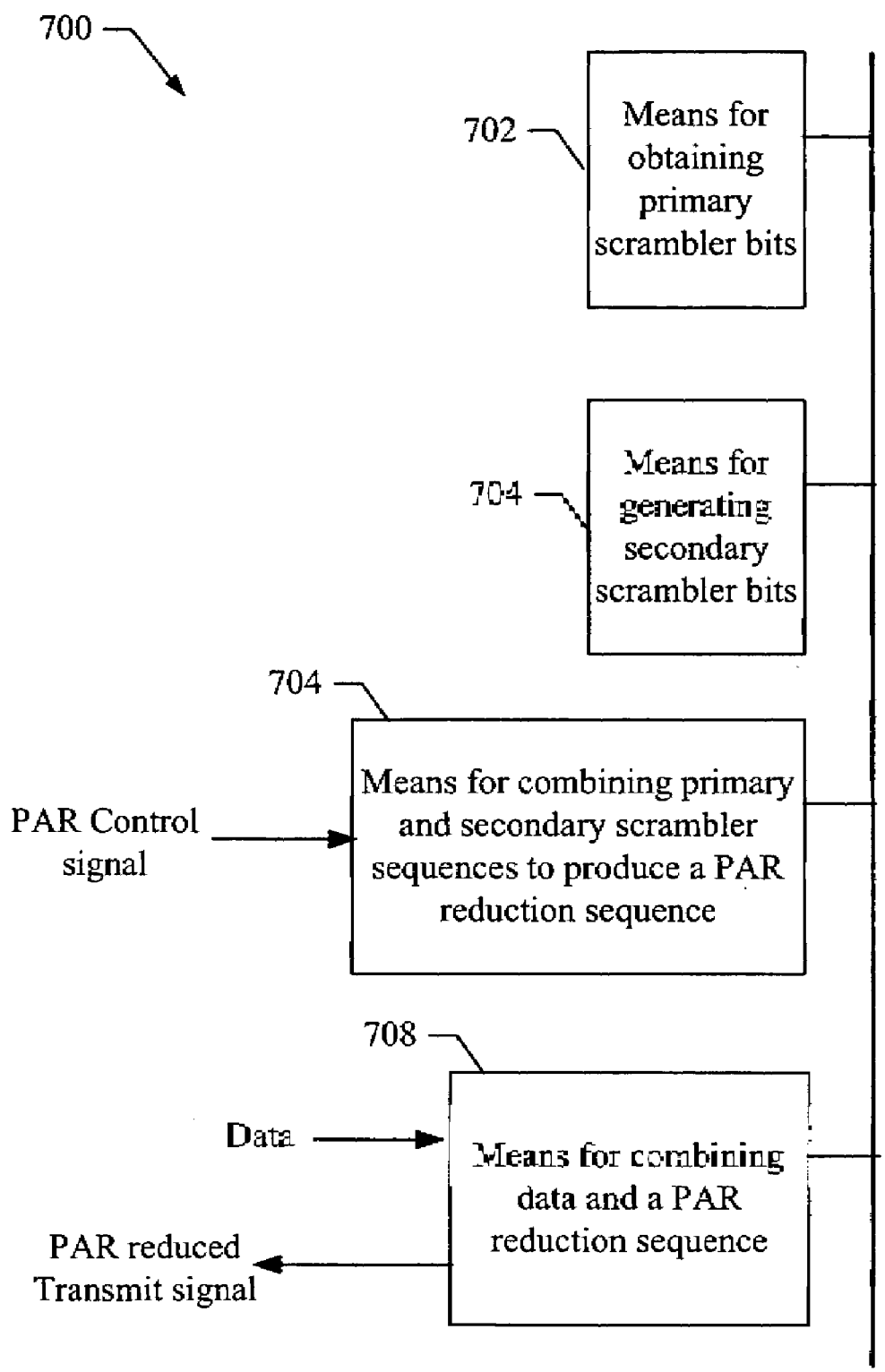
FIG. 7 shows an aspect of a PAR reduction system.

FIG. 7 shows an aspect of a PAR reduction system 700. The PAR reduction system 700 comprises means (702) for obtaining a primary scrambler sequence, means (704) for generating secondary scrambler sequence, means (706) combining the primary scrambler sequence and the secondary scrambler sequence to generate a PAR reduction sequence, and means (708) for combining data and a PAR reduction sequence.

In an aspect, the means 702-708 comprise one or more processors configured to execute program instructions to provide aspects of a PAR reduction system as described herein.

In an aspect, the means 702 comprises the exclusive "OR" logic 302, the means 704 comprises the secondary scrambler 304, the means 706 comprises the exclusive "OR" logic 302 and the selector logic 306, and the means 708 comprises the exclusive "OR" logic 320.

Therefore various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a PAR reduction system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for reducing a peak to average ratio (PAR) of a transmit waveform, the method comprising:
   obtaining a primary scrambler sequence comprising a sequence of data bits configured to randomize data from a plurality of symbols;
   generating a secondary scrambler sequence comprising a sequence of data bits shorter in length than the primary scrambler sequence and being configured to randomize data to be transmitted within a single symbol, wherein the length of the secondary scrambler sequence is based on a length of the data to be transmitted in the single symbol;
   selectively combining the primary and secondary scrambler sequences to produce a PAR reduction sequence based on whether a PAR control signal is in a first state or a second state, wherein the PAR reduction sequence comprises the primary scrambler sequence when the PAR control signal is in the first state, and the PAR reduction sequence comprises the combined primary and secondary scrambler sequences when the PAR control signal is in the second state.

2. The method of claim 1, wherein said generating comprises generating the secondary scrambler sequence from a table.

3. The method of claim 1, wherein said generating comprises generating the secondary scrambler sequence from a linear feedback shift register.

4. The method of claim 1, wherein said combining comprises performing an exclusive-OR operation to combine the primary scrambler sequence and the secondary scrambler sequence.

5. The method of claim 1, further comprising combining the PAR reduction sequence and data to produce the transmit waveform.

6. An apparatus for reducing a peak to average ratio (PAR) of a transmit waveform, the apparatus comprising:
- a secondary generator configured to generate a secondary scrambler sequence having a length characteristic based on data to be scrambled, the secondary scramble sequence being configured to randomize data to be transmitted within a single symbol; and
- combining logic configured to selectively combine a primary scrambler sequence and the secondary scrambler sequences to produce a PAR reduction sequence based on whether a PAR control signal is in a first state or a second state, wherein the PAR reduction sequence comprises the primary scrambler sequence when the PAR control signal is in the first state, and the PAR reduction sequence comprises the combined primary and secondary scrambler sequences when the PAR control signal is in the second state,
- wherein the primary scrambler sequence comprises a sequence of data bits configured to randomize data from a plurality of symbols, and wherein the secondary scrambler sequence is shorter in length than the primary scrambler sequence.

7. The apparatus of claim 6, wherein said secondary generator is configured to generate the secondary scrambler sequence from a table.

8. The apparatus of claim 6, wherein said secondary generator is configured to generate the secondary scrambler sequence from a linear feedback shift register.

9. The apparatus of claim 6, wherein said combining logic is configured to perform an exclusive-OR operation to combine the primary scrambler sequence and the secondary scrambler sequence.

10. The apparatus of claim 6, further comprising second combining logic configured to combine the PAR reduction sequence and data to produce the transmit waveform.

11. An apparatus for reducing a peak to average ratio (PAR) of a transmit waveform, the apparatus comprising:
- means for obtaining a primary scrambler sequence comprising a sequence of data bits configured to randomize data from a plurality of symbols;
- means for generating a secondary scrambler sequence comprising a sequence of data bits shorter in length than the primary scrambler sequence and being configured to randomize data to be transmitted within a single symbol, wherein the length of the secondary scrambler sequence is based on a length of the data to be transmitted in the single symbol; and
- means for selectively combining the primary and secondary scrambler sequences to produce a PAR reduction sequence based on whether a PAR control signal is in a first state or a second state, wherein the PAR reduction sequence comprises the primary scrambler sequence when the PAR control signal is in the first state, and the PAR reduction sequence comprises the combined primary and secondary scrambler sequences when the PAR control signal is in the second state.

12. The apparatus of claim 11, wherein said means for generating comprises means for generating the secondary scrambler sequence from a table.

13. The apparatus of claim 11, wherein said means for generating comprises means for generating the secondary scrambler sequence from a linear feedback shift register.

14. The apparatus of claim 11, wherein said means for combining comprises means for performing an exclusive-OR operation to combine the primary scrambler sequence and the secondary scrambler sequence.

15. The apparatus of claim 11, further comprising means for combining the PAR reduction sequence and data to produce the transmit waveform.

16. A computer-readable medium having a computer program comprising instructions, which when executed by at least one processor, operate to reduce a peak to average ratio (PAR) of a transmit waveform, the computer program comprising:
- instructions for obtaining a primary scrambler sequence comprising a sequence of data bits configured to randomize data from a plurality of symbols;
- instructions for generating a secondary scrambler sequence comprising a sequence of data bits shorter in length than the primary scrambler sequence and being configured to randomize data to be transmitted within the single symbol, wherein the length of the secondary scrambler sequence is based on a length of the data to be transmitted in a single symbol; and
- instructions for selectively combining the primary and secondary scrambler sequences to produce a PAR reduction sequence based on whether a PAR control signal is in a first state or a second state, wherein the PAR reduction sequence comprises the primary scrambler sequence when the PAR control signal is in the first state, and the PAR reduction sequence comprises the combined primary and secondary scrambler sequences when the PAR control signal is in the second state.

17. The computer program of claim 16, wherein said instructions for generating comprise instructions for generating the secondary scrambler sequence from a table.

18. The computer program of claim 16, wherein said instructions for generating comprise instructions for generating the secondary scrambler sequence from a linear feedback shift register.

19. The computer program of claim 16, wherein said instructions for combining comprise instructions for performing an exclusive-OR operation to combine the primary scrambler sequence and the secondary scrambler sequence.

20. The computer program of claim 16, further comprising instructions for combining the PAR reduction sequence and data to produce the transmit waveform.

21. At least one processor configured to perform a method for reducing a peak to average ratio (PAR) of a transmit waveform, the method comprising:
- obtaining a primary scrambler sequence comprising a sequence of data bits configured to randomize data from a plurality of symbols;
- generating a secondary scrambler sequence comprising a sequence of data bits shorter in length than the primary scrambler sequence and being configured to randomize data to be transmitted within a single symbol, wherein the length of the secondary scrambler sequence is based on a length of the data to be transmitted in the single symbol; and
- selectively combining the primary and secondary scrambler sequences to produce a PAR reduction sequence based on whether a PAR control signal is in a first state or a second state, wherein the PAR reduction sequence comprises the primary scrambler sequence when the PAR control signal is in the first state, and the PAR reduction sequence comprises the combined primary and secondary scrambler sequences when the PAR control signal is in the second state.

22. The method of claim 21, wherein said generating comprises generating the secondary scrambler sequence from a table.

23. The method of claim 21, wherein said generating comprises generating the secondary scrambler sequence from a linear feedback shift register.

24. The method of claim 21, wherein said combining comprises performing an exclusive-OR operation to combine the primary scrambler sequence and the secondary scrambler sequence.

25. The method of claim 21, further comprising combining the PAR reduction sequence and data to produce the transmit waveform.

26. The method of claim 1, wherein selectively combining comprises combining the primary scrambler sequence and the secondary scrambler sequence to produce the PAR reduction sequence when data to be scrambled comprises a non-data value.

27. The apparatus of claim 6, wherein the combining logic is configured to combine the primary scrambler sequence and the secondary scrambler sequence to produce the PAR reduction sequence when data to be scrambled comprises a non-data value.

28. The apparatus of claim 11, wherein the means for selectively combining is configured to combine the primary scrambler sequence and the secondary scrambler sequence to produce the PAR reduction sequence when data to be scrambled comprises a non-data value.

29. The computer program of claim 16, wherein the instructions for selectively combining comprise instructions for combining the primary scrambler sequence and the secondary scrambler sequence to produce the PAR reduction sequence when data to be scrambled comprises a non-data value.

30. The method of claim 21, wherein selectively combining comprises combining the primary scrambler sequence and the secondary scrambler sequence to produce the PAR reduction sequence when data to be scrambled comprises a non-data value.

31. The method of claim 1, wherein the PAR control signal is in the first state when data to be scrambled comprises data values.

32. The apparatus of claim 6, wherein the PAR control signal is in the first state when data to be scrambled comprises data values.

33. The apparatus of claim 11, wherein the PAR control signal is in the first state when data to be scrambled comprises data values.

34. The computer program product of claim 16, wherein the PAR control signal is in the first state when data to be scrambled comprises data values.

35. The method of claim 14, wherein the PAR control signal is in the first state when data to be scrambled comprises data values.

* * * * *